(12) United States Patent
Heizmann

(10) Patent No.: US 10,666,117 B2
(45) Date of Patent: May 26, 2020

(54) INTERFERENCE SUPPRESSION SYSTEM, DRIVE, AND HANDHELD POWER TOOL

(71) Applicant: Robert Bosch GmbH, Stuttgart (DE)

(72) Inventor: Joachim Heizmann, Immendingen (DE)

(73) Assignee: Robert Bosch GmbH, Stuttgart (DE)

( * ) Notice: Subject to any disclaimer, the term of this patent is extended or adjusted under 35 U.S.C. 154(b) by 435 days.

(21) Appl. No.: 15/730,970

(22) Filed: Oct. 12, 2017

(65) Prior Publication Data

US 2018/0109165 A1    Apr. 19, 2018

(30) Foreign Application Priority Data

Oct. 14, 2016  (DE) .................. 10 2016 220 070

(51) Int. Cl.
| | |
|---|---|
| *H02K 11/026* | (2016.01) |
| *H02K 11/02* | (2016.01) |
| *H02K 7/14* | (2006.01) |
| *B25F 5/00* | (2006.01) |

(52) U.S. Cl.
CPC .............. *H02K 11/026* (2013.01); *B25F 5/00* (2013.01); *H02K 7/145* (2013.01); *H02K 11/02* (2013.01)

(58) Field of Classification Search
CPC ...... H02K 11/026; H02K 11/02; H02K 7/145; B25F 5/00
See application file for complete search history.

(56) References Cited

U.S. PATENT DOCUMENTS

| | | | | |
|---|---|---|---|---|
| 3,903,440 A | * | 9/1975 | Paule ................ | B23B 45/001 310/50 |
| 4,638,196 A | * | 1/1987 | Kranzler ............ | H02K 5/148 310/50 |
| 5,458,159 A | * | 10/1995 | Kilmer ............... | H01R 43/033 140/122 |
| 6,225,565 B1 | * | 5/2001 | Prysner ............. | H01B 9/027 174/120 SC |
| 6,623,275 B1 | * | 9/2003 | Pavlovic ........... | H01R 13/7197 439/38 |
| 6,857,179 B2 | * | 2/2005 | Luttrell ............. | H02K 15/065 29/592.1 |
| 7,307,495 B2 | * | 12/2007 | McLauchlan ..... | H01R 4/2433 333/184 |
| 9,241,757 B2 | * | 1/2016 | Beardsley ......... | H01R 13/7197 439/38 |
| 2007/0052500 A1 | * | 3/2007 | Korich .............. | H01R 4/30 333/202 |
| 2008/0100400 A1 | * | 5/2008 | Lucas ................ | H05K 9/0066 333/181 |
| 2012/0319508 A1 | * | 12/2012 | Oomori ............ | B25F 5/02 310/50 |

* cited by examiner

*Primary Examiner* — Emily P Pham
(74) *Attorney, Agent, or Firm* — Norton Rose Fulbright US LLP; Gerard Messina

(57) ABSTRACT

An interference suppression system, a drive having such a suppression system, and a handheld power tool having such a drive, the interference suppression system including a core, the core having exactly one first through-opening, one second through-opening, and one third through-opening, a first segment of a first connecting line of the drive being situated in the first through-opening, a second segment of a second connecting line of the drive being situated in the second through-opening, and a third segment of a third connecting line of the drive being situated in the third through-opening.

12 Claims, 4 Drawing Sheets

A - A

A - A

INTERFERENCE SUPPRESSION SYSTEM, DRIVE, AND HANDHELD POWER TOOL

CROSS REFERENCE

The present application claims the benefit under 35 U.S.C. § 119 of German Patent Application No. DE 102016220070.4 filed on Oct. 14, 2017, which is expressly incorporated herein by reference in its entirety.

FIELD

The present invention relates to an interference suppression system, a drive, and a handheld power tool.

BACKGROUND INFORMATION

A conventional drill hammer has a drive, a control device, a rechargeable battery pack, and a tool holder, the drive including a brushless DC motor. The brushless DC motor drives the tool holder. The control device is used to control the brushless DC motor and, for this purpose, provides electrical energy to the brushless DC motor from the battery pack. If the control device has MOSFET transistors, interference currents may occur in connection with an inductance of the brushless DC motor when the MOSFET transistors are switched on and switched off, which interference currents impair the electromagnetic compatibility of the drill hammer.

SUMMARY

An object of the present invention is to provide an improved interference suppression system, an improved drive, and an improved handheld power tool.

This object may be achieved by an interference suppression system, a drive, and a handheld power tool in accordance with the present invention. Advantageous specific embodiments of the present invention are described herein.

According to the present invention, an improved interference suppression system for a handheld power tool can be provided in that the interference suppression system includes a core, the core having exactly one first through-opening, one second through-opening, and one third through-opening, a first segment of a first connecting line of the drive being situated in the first through-opening, a second segment of a second connecting line of the drive being situated in the second through-opening, and a third segment of a third connecting line of the drive being situated in the third through-opening.

This embodiment may have the advantage that the interference suppression system is made particularly compact. In addition, the interference suppression system is particularly robust against vibration, so that the electromagnetic compatibility of the handheld power tool is ensured over the entire useful life of the handheld power tool.

In a further specific embodiment, the first through-opening and/or the second through-opening and/or the third through-opening is fashioned as a bore. As a result, it is particularly simple to produce the core in a sintering process or a cutting process.

In a further specific embodiment, the first through-opening is situated parallel to the second through-opening and parallel to the third through-opening.

In a further specific embodiment, the first through-opening has a first inner diameter. The second opening has a second inner diameter. The third through-opening has a third inner diameter, and the first through third inner diameters of the first through third through-openings are identical. This simplifies the mounting of the core on the connecting lines, because an orientation of the core relative to the connecting lines can be omitted.

In a further specific embodiment, an outer circumferential surface of the core is made to have a prismatic or rectangular shape. In this way, when a common-mode interference signal is introduced into the first through third connecting line, it is ensured that a magnetic flux flows optimally within the core, while at the same time no unnecessary material is additionally installed on the core.

In a further specific embodiment, the first through-opening extends along a first longitudinal axis. The second through-opening extends along a second longitudinal axis. The third through-opening extends along a third longitudinal axis. Each of the longitudinal axes has an identical distance to the respective other longitudinal axes. Alternatively, the longitudinal axes are situated in a common plane. In this way, when a push-pull interference signal is introduced in the first through third connecting line, a reliable attenuation of the push-pull interference by the core is ensured.

In a further specific embodiment, the first through-opening has an inner circumferential surface, the core having an outer circumferential surface, a wall thickness between a first segment of the inner circumferential surface and a second segment of the outer circumferential surface being essentially constant over an angular segment. The angular segment preferably extends over 120° or 180°. This enables the core to be optimized with respect to weight.

In a further specific embodiment, the core has a first end face and a second end face oriented opposite the first end face in the longitudinal direction, the first end face being situated parallel to the second end face. Preferably, the first end face and/or the second end face is situated perpendicular to at least one of the through-openings.

In a further specific embodiment, the drive has an electrical machine, a first connecting line, a second connecting line, a third connecting line and an interference suppression system, the interference suppression system being fashioned as described above, a first segment of the first connecting line of the drive being guided through the first through-opening, a second segment of the second connecting line of the drive being guided through the second through-opening, and a third segment of the third connecting line of the drive being guided through the third through-opening. The electrical machine is fashioned as a brushless electric motor and has a first terminal, a second terminal, and a third terminal. The first terminal is connected to the first connecting line. The second terminal is connected to the second connecting line. The third terminal is connected to the third connecting line.

In a further specific embodiment, the drive has a control device. The electrical machine has a first winding system, a second winding system, and a third winding system, the first winding system being electrically connected to the first terminal. The second winding system is electrically connected to the second terminal. The third winding system is electrically connected to the third terminal. The control device can be connected at the input side to an electrical power source, preferably a DC power source. The control device is connected at the output side to the first connecting line, the second connecting line and the third connecting line. The control device is fashioned to provide a quantity of electrical energy such that the winding systems form a rotary field in the electrical machine. The control device preferably has a switching element, in particular a MOSFET transistor.

In a further specific embodiment, the handheld power tool has a drive. The drive is fashioned as described above.

In a further specific embodiment, the handheld power tool is fashioned as a drill hammer, a drill screwdriver, a saw, in particular a chain saw or circular saw, a brush cutter, or a parting-off grinder.

The present invention is explained in more detail below on the basis of the figures.

DETAILED DESCRIPTION OF EXAMPLE EMBODIMENTS

Figure 1:
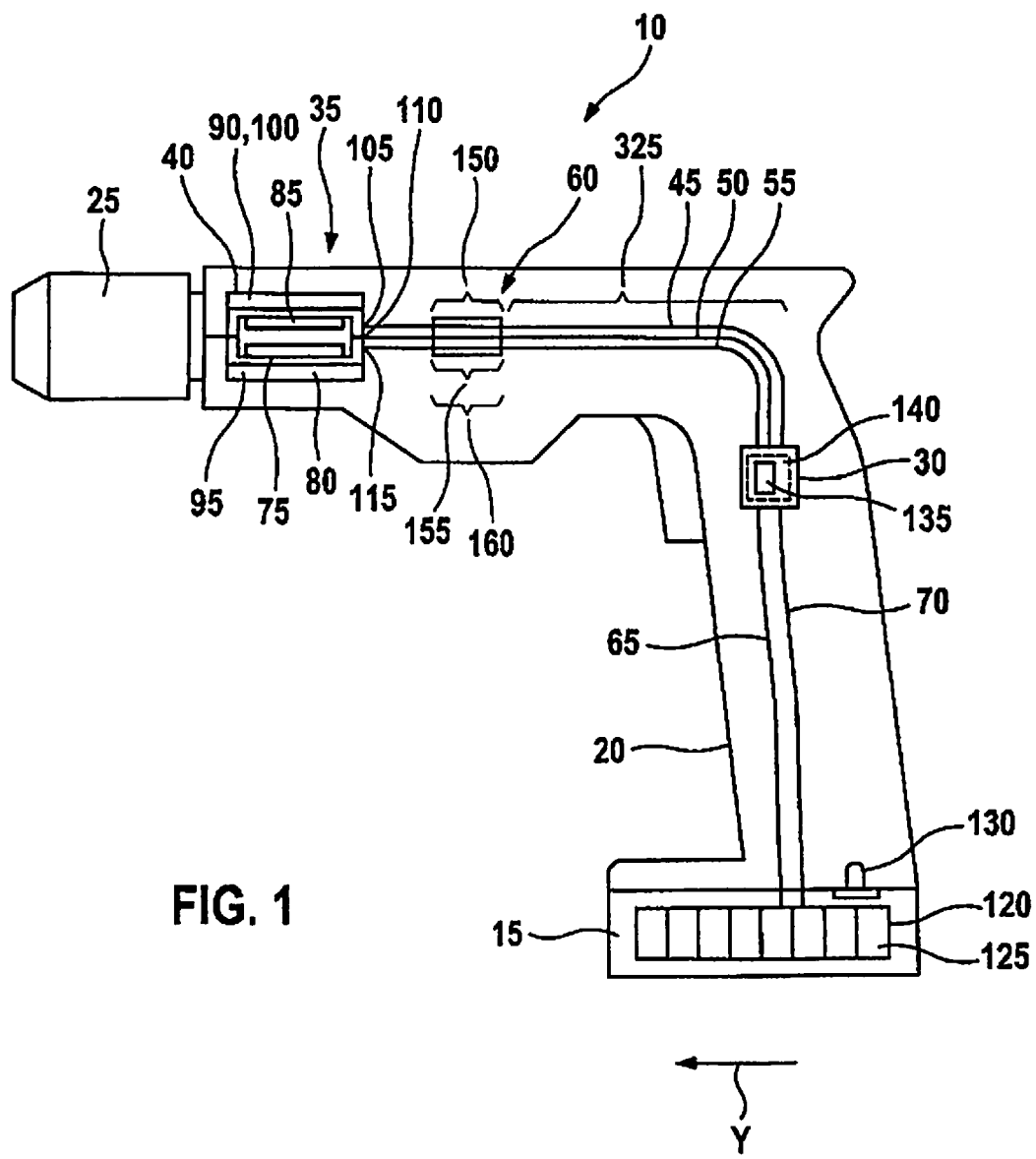
FIG. 1 shows a schematic diagram of a handheld machine tool having a drive that has an interference suppression system.

FIG. 1 shows a schematic representation of a handheld power tool 10.

In the specific embodiment, as an example handheld power tool 10 can be connected mechanically and electrically to a rechargeable battery pack 15 for mains-independent power supply. Handheld power tool 10 can also be connected to an alternating current and battery pack 15 can be omitted. In FIG. 1, as an example, handheld power tool 10 is fashioned as a drill screwdriver. Handheld power tool 10 can also be fashioned as a drill hammer, hedge trimmer, lawn mower, brush cutter, or saw, in particular a chain saw or circular saw.

Handheld power tool 10 has a machine housing 20, a tool holder 25, and a drive 35. Drive 35 has a control device 30, an electrical machine 40, a first connecting line 45, a second connecting line 50, a third connecting line 55 and an interference suppression system 60. In addition, handheld power tool 10 includes a fourth connecting line 65 and a fifth connecting line 70.

Electrical machine 40 is fashioned for example as a brushless DC (BL-DC) motor and has a rotor 75 and a stator 80. Rotor 75 is connected to tool holder 25 in torque-locked fashion. Rotor 75 has for example a system of permanent magnets 85. Rotor 75 can also have at least one coil.

Stator 80 has a first winding system 90, a second winding system 95, and a third winding system 100. Each of the winding systems 90, 95, 100 can have one or more windings that are connected to one another in series or in parallel.

Electrical machine 40 has, in addition, a first terminal 105, a second terminal 110 and a third terminal 115. First terminal 105 is electrically connected to a first side of first winding system 90. In addition, second terminal 110 is electrically connected to a first side of second winding system 95. In addition, third terminal 115 is electrically connected to a first side of third winding system 100.

First connecting line 45 is connected to first terminal 105 and to control device 30. Second connecting line 50 is connected to control device 30 and to second terminal 110, and third connecting line 55 is connected to control device 30 and to third terminal 115.

Battery pack 15 has an electrical energy storage unit 120 preferably having a multiplicity of cells 125. Cells 125 can be connected in parallel and/or in series to each other. Electrical energy storage unit 120 can be fashioned as a nickel-metal hydride accumulator or as a lithium-ion accumulator, for example. Electrical energy storage unit 120 is fashioned to provide a first quantity of electrical energy having a direct voltage. In addition, electrical machine 40 has a connection means 130 for connecting battery pack 15 mechanically to machine housing 20 and electrically to fourth connecting line 65 and to fifth connecting line 70. Fourth and fifth connecting lines 65, 70 are connected to control device 30.

Control device 30 has at least one control circuit 140 having at least one switching element 135. Switching element 135 can be fashioned for example as a semiconductor switching element, in particular as a MOSFET transistor. Control circuit 140 can have for example a B6 bridge circuit having six switching elements 135. Switching element 135 has a switching element capacitor.

When switching element 135 is switched off, a high-frequency oscillation occurs between an output voltage of control circuit 140 and switched-off switching element 135. This oscillation produces a high-frequency interference current and interference voltage between the switching element capacitor and an inductor of electrical machine 40 in first through third connecting lines 45, 50, 55 of electrical machine 40. The interference current can have a high frequency from a broad frequency spectrum.

In order to activate handheld power tool 10, electrical energy storage unit 120 provides a first quantity of electrical energy, having a direct voltage, to control device 30. Using control circuit 140, control device 30 provides a second quantity of electrical energy having an alternating voltage, which is forwarded to winding systems 90, 95, 100 via first through third connecting lines 45, 50, 55 and terminals 105, 110, 115. Winding systems 90, 95, 100 are situated geometrically relative to each other in such a way, and the provided second quantity of electrical energy is realized in such a way, that a rotary field is produced in electrical machine 40, and rotor 75 provides a torque for driving tool holder 25 on the basis of the rotary field.

Figure 2:
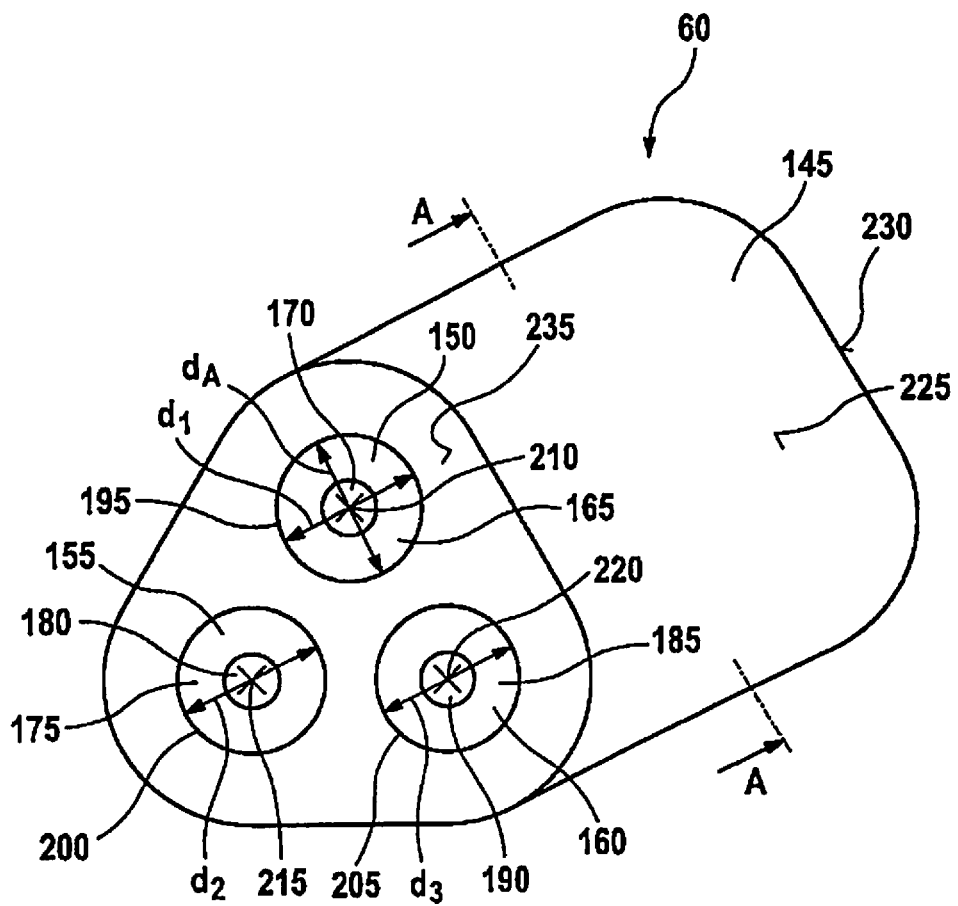
FIG. 2 shows a perspective view of the interference suppression system shown in FIG. 1.

FIG. 2 shows a perspective view of interference suppression system 60.

Interference suppression system 60 has a core 145, a first segment 150 of first connecting line 45, a second segment 155 of second connecting line 50, and a third segment 160 of third connecting line 55.

First connecting line 45 has a first insulator 165 and a first electrical conductor 170. First insulator 165 electrically insulates first electrical conductor 170. Here, first insulator 165 completely surrounds first electrical conductor 170.

Second connecting line 50 has a second insulator 175 and a second electrical conductor 180. Second electrical conductor 180 is completely surrounded by second insulator 175. Here, second insulator 175 insulates second electrical conductors 180.

Third connecting line 55 has a third insulator 185 and a third electrical conductor 190. Third electrical conductor 190 is surrounded and electrically insulated by third insulator 185.

In this specific embodiment, first electrical conductor 170, second electrical conductor 180, and third electrical conductor 190 are fashioned identically to one another. Likewise, first insulator 165, second insulator 175 and third insulator 185 are fashioned identically to each other. Of course, insulators 165, 175, 185 and/or electrical conductors 170, 180, 190 can be fashioned differently from each other.

Core 145 preferably has ferrite as material. Core 145 has exactly one first through-opening 195, one second through-opening 200, and one third through-opening 205. A different number of through-openings 195, 200, 205 is not provided. In particular, the number of through-openings 195, 200, 205 is not greater than three. There is also no functionality of interference suppression system 60 with fewer than three through-openings 195, 200, 205.

First through-opening 195 extends along a first longitudinal axis 210. Second through-opening 200 extends along a second longitudinal axis 215. Third through-opening 205 extends along a third longitudinal axis 220. First through-opening 195 has a first inner diameter $d_1$, second through-opening 200 has a second inner diameter $d_2$, and third through-opening 205 has a third inner diameter $d_3$. It is particularly advantageous if inner diameters $d_1$, $d_2$, $d_3$ of first through third through-openings 195, 200, 205 are identical to each other. Here it is of particular advantage if inner diameter $d_1$, $d_2$, $d_3$ essentially corresponds to an outer diameter $d_4$ of first through third line segments 150, 155, 160, routed respectively through through-openings 195, 200, 205.

First through-opening 195 and/or second through-opening 200 and/or third through-opening 205 is fashioned as a bore. Of course, first through-opening 195 and/or second through-opening 200 and/or third through-opening 205 may also have a different cross-sectional shape. For example, it is also conceivable that first through-opening 195 and/or second through-opening 200 and/or third through-opening 205 may be polygonal, rectangular, elliptical, or may have some other shape.

First through-opening 195 is situated parallel to second through-opening 200. Second through-opening 200 is oriented parallel to third through-opening 205.

Core 145 has an outer circumferential surface 225. Outer circumferential surface 225 is essentially fashioned with a prismatic shape. Core 145 also has a first end face 230 and a second end face 235. Second end face 235 is offset in the longitudinal direction relative to first end face 230. In addition, first end face 230 and second end face 235 are oriented parallel to each other. It is particularly advantageous if at least one of the through-openings 195, 200, 205, preferably all through-openings 195, 200, 205, are situated perpendicular to first end face 230 and/or to second end face 235.

Figure 3:
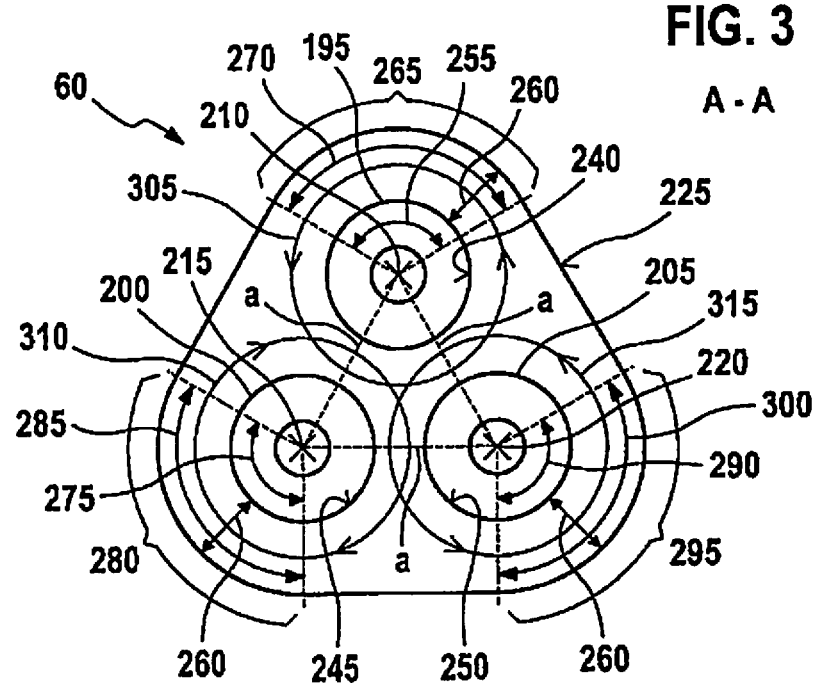
FIG. 3 shows a sectional view along a sectional plane A-A, shown in FIG. 2, through the interference suppression system shown in FIG. 2.

FIG. 3 shows a cross-section along a sectional plane A-A, shown in FIG. 2, through core 145 shown in FIG. 2.

It is particularly advantageous if each of the longitudinal axes 210, 215, 220 has an identical distance a to the other longitudinal axes 210, 215, 220. Longitudinal axes 210, 215, 220 thus form an isosceles prism, longitudinal axes 210, 215, 220 being situated at the respective edges of the isosceles prism. In this way, core 145 can be made particularly compact.

In addition, first through-opening 195 has a first inner circumferential surface 240. Second through-opening 200 has a second inner circumferential surface 245, and third through-opening 205 has a third inner circumferential surface 250. Inner circumferential surfaces 240, 245, 250 each run on a circular path about longitudinal axis 210, 215, 220 of the respectively associated through-opening 195, 200, 205.

In a first segment 255 of first inner circumferential surface 240, a wall thickness 260 between first inner segment 255 and a second segment 265 of outer circumferential surface 225 is essentially constant over a first angular segment 270. Preferably, first angular segment 270 extends over an angle of 120°. The constant wall thickness 260 between first segment 255 and second segment 265 is achieved in that in second segment 265, outer circumferential surface 225 runs on a circular path about first longitudinal axis 210.

Likewise, second inner circumferential surface 245 has a third segment 275. Outer circumferential surface 225 has a fourth segment 280. Wall thickness 260 between third segment 275 and fourth segment 280 is selected such that wall thickness 260 is essentially constant over a second angular segment 285. Second angular segment 285 preferably extends over 120°. Outer circumferential surface 225 in fourth segment 280 runs in a circular path about second longitudinal axis 215.

Third inner circumferential surface 250 has a fifth segment 290 and outer circumferential surface 225 has a sixth segment 295. In sixth segment 295, outer circumferential surface 225 extends along a circular path about third longitudinal axis 220. Between fifth segment 290 and sixth segment 295, wall thickness 260 is essentially constant. Fifth segment 290 and sixth segment 295 essentially extend over a third angular segment 300. Third angular segment 300 preferably extends over 120°.

Outer circumferential surface 225 is made flat in each case between second segment 265 and fourth segment 280, and between fourth segment 280 and sixth segment 295, and between sixth segment 295 and second segment 265.

In FIG. 3, winding systems 90, 95, 100 are wired in star connection, so that a second coil of each of first, second and third winding systems 90, 95, 100 are electrically connected to one another. In addition, control device 30 provides only the second quantity of electrical energy, having an alternating voltage, between two of the first through third connecting lines 45, 50, 55. For example, control device 30 provides the second quantity of electrical energy with a potential between second connecting line 50 and third connecting line 55. First connecting line 45 is switched currentless.

FIG. 3 also shows the effect of a push-pull interference. Among interference emissions, a distinction is made between push-pull interference and common-mode interference. High-frequency voltages between electrical conductors 170, 180, 190 are referred to as push-pull interference.

The switching off of the corresponding switching element 135 of control circuit 140 produces, in connection with the inductance of first winding system 90 in first connecting line 45, a first interference signal running from control device 30 to first terminal 105 via first connecting line 45. Here a first magnetic field 305 forms around first electrical conductor 170. For example, the first magnetic field 305 has a counterclockwise orientation, as shown in FIG. 3.

If the electrical energy is transmitted from control device 30 to electrical machine 40 via second connecting line 50 and/or third connecting line 55, a current runs in the direction opposite that of the interference, which is why FIG. 3 also refers to a push-pull interference. The current of the second quantity of electrical energy flowing to electrical machine 40 forms a second magnetic field 310 around second electrical conductor 180 and a third magnetic field 315 around third electrical conductor 190. A direction of rotation of second and third magnetic fields 310, 315 is opposite that of first magnetic field 305. In FIG. 3, magnetic fields 305, 310, 315 are symbolically shown by flux lines.

Due to the high frequency (in the two- to three-digit kHz range) of the interference in first connecting line 45, core 145 acts, via its inductance, as a throttle on the interference, and attenuates the interference. This means that the interference is introduced with a greatly reduced level into a fourth segment 325 of first connecting line 45 between control device 30 and core 145.

Due to the low frequency of the alternating voltage of the second quantity of electrical energy, core 145 does not act as a throttle relative to the second quantity of electrical energy, so that this second quantity of energy can be conducted to electrical machine 40 without throttling.

Figure 4:
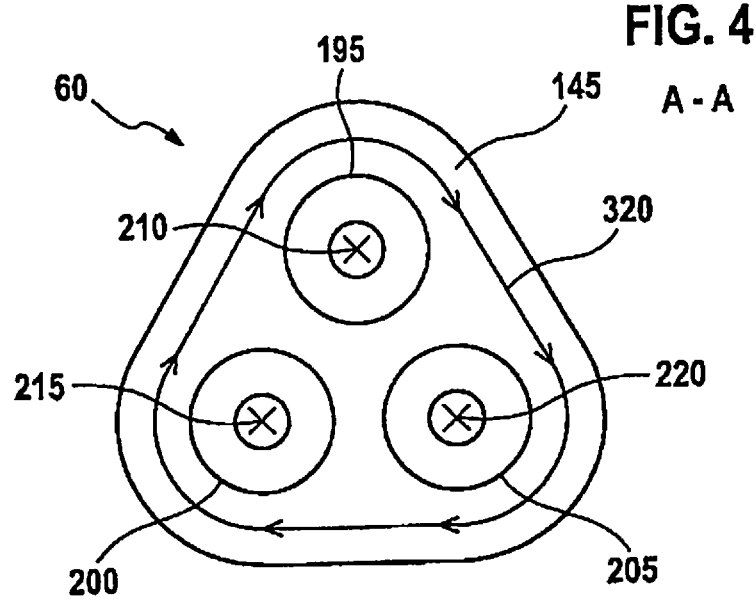
FIG. 4 shows a sectional view along sectional plane A-A, shown in FIG. 2, through the interference suppression system shown in FIG. 2.

FIG. 4 shows a sectional view along the sectional plane A-A shown in FIG. 2 through interference suppression system 60.

In FIG. 4, electrical machine 40 is wired in a delta connection, so that winding systems 90, 95, 100 are connected in series and second terminal 110 is electrically connected to a second side of first winding system 90. Third terminal 115 is electrically connected to a second side of second winding system 95. In addition, a second side of third winding system 100 is connected to first terminal 105.

If a (common-mode) interference signal having high frequency is introduced in first through third connecting lines 45, 50, 55 by control device 30, e.g., by switching off switching element 135, then first through third magnetic field 305, 310, 315 are produced around each of first through third connecting line 45, 50, 55, with the same direction of rotation. Resulting from this, a fourth magnetic field 320 is produced in core 145 by first through third magnetic field 305, 310, 315, which fourth field runs externally around through-opening 195, 200, 205. Due to the high frequency, core 145 acts as a throttle and the (common-mode) interference is reduced in connecting line 45, 50, 55.

Through the realization described above of interference suppression system 60, both common-mode and push-pull interferences can be easily attenuated, particularly in handheld power tools 10 having high voltage of battery pack 15, for example 36 V.

In particular, the compact design of core 145 in its one-piece, materially uniform realization means that interference suppression system 60 can be manufactured particularly inexpensively and easily. In addition, drive 35 can be installed particularly easily during assembly, by inserting first connecting line 45 through first through-opening 195, second connecting line 50 through second through-opening 200, and third connecting line 55 through third through-opening 205, and preferably situating core 145 as close as possible to electrical machine 40. In addition, a fastening means can be provided in order to fix core 145 in its position, for example, on machine housing 20.

In addition, the one-piece, materially uniform design of core 145 ensures that interference suppression system 60 is functional over the useful life of handheld power tool 10. Further, the fact that first through third connecting line 45, 50, 55 is inserted through the respective through-opening 195, 200, 205 without further manipulation prevents electrical conductor 170, 180, 190 of connecting line 45, 50, 55 from being damaged by core 145. In particular, insulator 165, 175, 185 surrounding electrical conductor 170, 180, 190 protects electrical conductor 170, 180, 190 against damage by core 145. In particular, it is advantageous that inner diameter $d_1$, $d_2$, $d_3$ of through-opening 195, 200, 205 corresponds essentially to outer diameter $d_4$ of connecting line 45, 50, 55 in line segment 150, 155, 160, so that a relative movement between line segment 150, 155, 160 and core 145 in through-opening 195, 200, 205 is prevented.

FIGS. 1 to 4 show exclusively that interference suppression system 60 has only one core 145, through which first through third connecting line 45, 50, 55 is routed. Of course, interference suppression system 60 can also include a plurality of cores 145, which are situated at a distance from or adjacent to each other and through which connecting lines 45, 50, 55 are routed.

Figure 5:
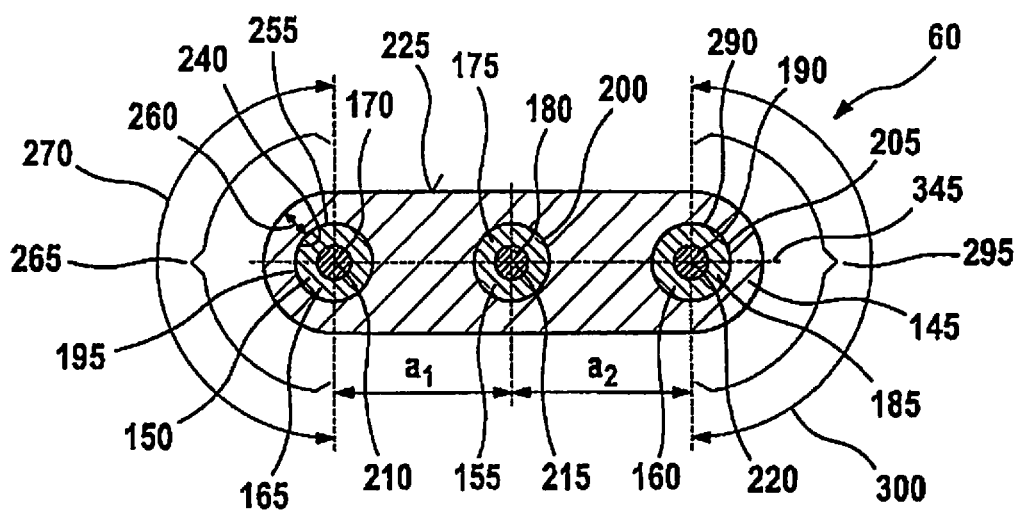
FIG. 5 shows a sectional view of a suppression system according to a second specific embodiment.

FIG. 5 shows a sectional view of a suppression system according to a second specific embodiment.

Interference suppression system 60 is fashioned essentially identically to suppression system 60 shown in FIGS. 1 through 4. Differing therefrom, longitudinal axes 210, 215, 220 of through-openings 195, 200, 205 are situated in a common plane 345. In addition, core 145 has a rectangular cross-section. First longitudinal axis 210 of first through-opening 195 has a first distance $a_1$ to the adjacent second longitudinal axis 215 of second through-opening 200. Second through-opening 200 is situated in the transverse direction between first through-opening 195 and third through-opening 205. Here, a second distance $a_2$ between second longitudinal axis 215 of second through-opening 200 and third longitudinal axis 220 is, as an example, identical to first distance $a_1$.

In first segment 255 of first inner circumferential surface 240, wall thickness 260 between first inner segment 255 and a second segment 265 of outer circumferential surface 225 is essentially constant over first angular segment 270. Preferably, first angular segment 270 extends over an angle of 180°. The constant wall thickness 260 between first segment 255 and second segment 265 is achieved in that, in second segment 265, outer circumferential surface 225 runs on a circular path about first longitudinal axis 210.

In addition, in sixth segment 295, outer circumferential surface 225 extends along a circular path about third longitudinal axis 220. Between fifth segment 290 and sixth segment 295, wall thickness 260 is essentially constant. Fifth segment 290 and sixth segment 295 extend essentially over a third angular segment 300. Third angular segment 300 preferably extends over 180°.

Figure 6:
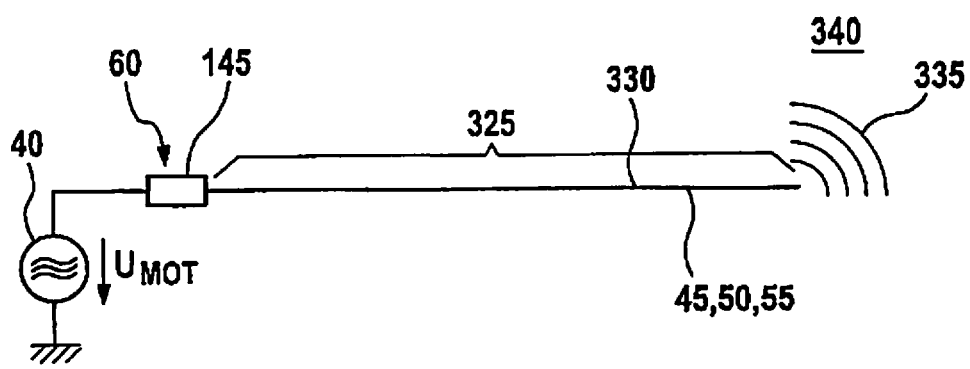
FIG. 6 shows an equivalent circuit diagram of the drive shown in FIGS. 1 through 4.

FIG. 6 shows an equivalent circuit diagram of drive 35 shown in FIGS. 1 to 4 according to a symmetrical antenna model.

During operation of electrical machine 40, rotor 75 rotates. When there is a change of the commutation of winding systems 90, 95, 100, at least one switching element 135 of control circuit 140 is switched off. With regard to electromagnetic compatibility, fourth line segment 325 between core 145 and control device 30 acts as an antenna 330, via which an electromagnetic field 335 generated by the interference is radiated into a surrounding environment 340.

Interference suppression system 60 strongly attenuates electromagnetic field 335 and improves the electromagnetic compatibility of handheld power tool 10.

Through the realization of interference suppression system 60 described in the Figures, it is ensured that brushless DC machines are also electromagnetically compatible in connection with control device 30, and comply with the respective EMC regulations.

In addition, interference suppression system 60 is particularly resistant to vibration, in particular when handheld power tool 10 is realized as a drill hammer. In addition, the compact design of interference suppression system 60 allows handheld power tool 10 to be fashioned particularly compactly.

What is claimed is:

1. An interference suppression system for a drive, comprising:

a core having exactly one first through-opening, one second through-opening, and one third through-opening, a first line segment of a first connecting line of the drive being situated in the first through-opening, a second line segment of a second connecting line of the drive being situated in the second through-opening, and a third line segment of a third connecting line of the drive being situated in the third through-opening.

2. The interference suppression system as recited in claim 1, wherein at least one of: (i) the first through-opening, (ii) the second through-opening, and (iii) the third through-opening being fashioned as a bore.

3. The interference suppression system as recited in claim 1, wherein the first through-opening being situated parallel to the second through-opening and parallel to the third through-opening.

4. The interference suppression system as recited in claim 1, wherein the first through-opening having a first inner diameter, the second through-opening having a second inner diameter, the third through-opening having a third inner diameter, the first, the second, and the third inner diameters of the first, second, and third through-openings being identical.

5. The interference suppression system as recited in claim 1, wherein an outer circumferential surface of the core being fashioned in a prismatic or rectangular shape.

6. The interference suppression system as recited in claim 1, wherein the first through-opening extends along a first longitudinal axis, the second through-opening extends along a second longitudinal axis, the third through-opening extends along a third longitudinal axis, wherein one of: (i) each of the first, second, and third longitudinal axes has an identical distance to the respective other longitudinal axes, or (ii) wherein the first, second, and third longitudinal axes being situated in a common plane.

7. The interference suppression system as recited in claim 1, wherein the first through-opening has an inner circumferential surface, the core has an outer circumferential surface, a wall thickness between a first segment of the inner circumferential surface and a second segment of the outer circumferential surface being constant over an angular segment, the angular segment extending over one of 120° or 180°.

8. The interference suppression system as recited in claim 1, wherein the core has a first end face and a second end face situated opposite the first end face in a longitudinal direction, the first end face being situated parallel to the second end face, and wherein at least one of: (i) the first end face, and (ii) the second end face, being situated perpendicular to at least one of the first, second, and third through-openings.

9. A drive for a handheld power tool, comprising:
an electrical machine;
a first connecting line;
a second connecting line;
a third connecting line; and
an interference suppression system including a core having exactly one first through-opening, one second through-opening, and one third through-opening, a first line segment of the first connecting line being situated in the first through-opening, a second line segment of the second connecting line being situated in the second through-opening, and a third line segment of the third connecting line being situated in the third through-opening;
wherein the electrical machine is a brushless electric motor and includes a first terminal, a second terminal, and a third terminal, the first terminal being connected to the first connecting line, the second terminal being connected to the second connecting line, and the third terminal is connected to the third connecting line.

10. The drive as recited in claim 9, further comprising:
a control device;
wherein the electrical machine has a first winding system, a second winding system, and a third winding system, the first winding system being electrically connected to the first terminal, the second winding system being electrically connected to the second terminal, and the third winding system being electrically connected to the third terminal, and wherein the control device is being connected at an input side to an electrical energy source, the control device being connected at an output side to the first connecting line, the second connecting line, and the third connecting line, the control device being configured to provide a quantity of electrical energy for the first, second and third winding systems to form a rotary field in the electrical machine, and wherein the control device has at least one switching element, the switching element being a MOSFET transistor.

11. The drive as recited in claim 10, wherein the electrical energy source is a direct voltage energy source.

12. A handheld power tool, comprising:
a driving including an electrical machine, a first connecting line, a second connecting line, a third connecting line, and an interference suppression system including a core having exactly one first through-opening, one second through-opening, and one third through-opening, a first line segment of the first connecting line being situated in the first through-opening, a second line segment of the second connecting line being situated in the second through-opening, and a third line segment of the third connecting line being situated in the third through-opening, wherein the electrical machine is a brushless electric motor and includes a first terminal, a second terminal, and a third terminal, the first terminal being connected to the first connecting line, the second terminal being connected to the second connecting line, and the third terminal is connected to the third connecting line;
wherein the handheld power tool is one of: (i) a drill hammer, (ii) a drill screwdriver, (iii) a parting-off grinder, (iv) a brush cutter, or (v) a hedge trimmer.

* * * * *